(12) United States Patent
Park et al.

(10) Patent No.: US 9,335,458 B2
(45) Date of Patent: May 10, 2016

(54) BACKLIGHT UNIT AND LIQUID CRYSTAL DISPLAY DEVICE USING THE SAME

(71) Applicant: LG Display Co., Ltd., Seoul (KR)

(72) Inventors: Ki Duck Park, Gyeonggi-do (KR); Hoan Su Shim, Incheon (KR); Hyung Seok Bang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 79 days.

(21) Appl. No.: 14/475,752

(22) Filed: Sep. 3, 2014

(65) Prior Publication Data

US 2015/0062482 A1   Mar. 5, 2015

(30) Foreign Application Priority Data

Sep. 3, 2013 (KR) .................. 10-2013-0105390

(51) Int. Cl.
*G02F 1/1335* (2006.01)
*F21V 8/00* (2006.01)

(52) U.S. Cl.
CPC .............. *G02B 6/0031* (2013.01); *G02B 6/005* (2013.01); *G02B 6/0036* (2013.01)

(58) Field of Classification Search
CPC ................................................ G02F 1/133504
See application file for complete search history.

(56) References Cited

U.S. PATENT DOCUMENTS

| 7,876,393 | B2* | 1/2011 | Tanabe | G02B 6/0021 349/62 |
| 8,704,964 | B2* | 4/2014 | Lee | G02F 1/133308 349/40 |
| 9,007,547 | B2* | 4/2015 | Huang | G09F 13/18 313/113 |
| 9,140,930 | B2* | 9/2015 | Huang | G02F 1/133382 |
| 2008/0297696 | A1* | 12/2008 | Banerjee | G02B 5/3058 349/65 |
| 2010/0020267 | A1* | 1/2010 | Kobayashi | G02F 1/133603 349/64 |
| 2014/0176865 | A1* | 6/2014 | Chang | G02F 1/133615 349/64 |
| 2014/0340931 | A1* | 11/2014 | Nishitani | G02B 6/0028 362/609 |
| 2015/0029440 | A1* | 1/2015 | Huang | G02B 6/0031 349/65 |
| 2015/0219954 | A1* | 8/2015 | Kubo | G02F 1/133308 348/794 |

* cited by examiner

*Primary Examiner* — Timothy L Rude

(74) *Attorney, Agent, or Firm* — Morgan, Lewis & Bockius LLP

(57) ABSTRACT

A backlight unit and an LCD device using the same are provided. The backlight unit includes a light guide panel, a light source unit disposed at a rear-direction lower end of the light guide panel, an optical film disposed in a front direction of the light guide panel to face the light source unit and configured to reflect light emitted from the light source unit, and an optical sheet part disposed in the front direction of the light guide panel, and configured to change a travel direction of the light, which is output from the light guide panel, to a direction vertical to the light guide panel.

10 Claims, 6 Drawing Sheets

BACKLIGHT UNIT AND LIQUID CRYSTAL DISPLAY DEVICE USING THE SAME

CROSS-REFERENCE TO RELATED APPLICATIONS

This application claims the benefit of the Korean Patent Application No. 10-2013-0105390 filed on Sep. 3, 2013, which is hereby incorporated by reference as if fully set forth herein.

BACKGROUND OF THE INVENTION

1. Field of the Invention

The present invention relates to a backlight unit, and more particularly, to a backlight unit and a liquid crystal display (LCD) device using the same, which are manufactured in a slim type.

2. Discussion of the Related Art

Flat Panel Display (FPD) devices are applied to various electronic products such as portable phones, tablet PCs, notebooks, etc. The FPD devices include Liquid crystal Display (LCD) device, Plasma Display panels (PDPs), and Organic Light Emitting Display (OLED) Device, etc. Recently, elctropohretic display (EPD) devices are widely used as the FPD devices.

In such FPD devices (hereinafter simply referred to as a display device), the LCD devices are being the most widely commercialized at present because the LCD devices are easily manufactured due to the advance of manufacturing technology and realize a drivability of a driver and a high-quality image.

Since the LCD devices are not self-emitting devices, the LCD devices include a backlight unit provided under a liquid crystal panel, and display an image by using light emitted from the backlight unit.

The LCD devices are categorized into an edge type and a direct type depending on an arrangement of a light source configuring the backlight unit.

FIGS. 1A and 1B are side views illustrating a configuration of a light source and a light guide panel applied to a related art edge type LCD device. FIG. 1 (a) illustrates a light guide panel 13 having the same width as that of a light source 12, and FIG. 1 (b) illustrates a light guide panel 14 having a smaller width than that of the light source 12.

In the edge type LCD device, as illustrated in FIGS. 1A and 1B, a light source unit including a printed circuit board (PCB) 11 and the light source 12 is disposed at one side of the light guide panel 13 (14) which is provided at a rear surface of a liquid crystal panel. A light emitting diode (LED) package equipped with an LED is being widely used as the light source 12.

Light emitted from the light source 12 is converted into flat light by the light guide panel 23, and is irradiated onto the liquid crystal panel.

Therefore, in comparison with a direct type LCD device, the edge type LCD device is reduced in thickness.

In the related art edge type LCD device, as illustrated in FIG. 1A, a thickness X of the light guide panel 13 is formed identically to a width Y of the light source 12 in consideration of light incident efficiency. In detail, the width Y of the light source 12 denotes a width of a window in which light is emitted from the LED package configured with the LED.

As described above, since the thickness X of the light guide panel 13 is formed identically to the width Y of the light source 12, most of light emitted from the light source 12 is incident on the inside of the light guide panel 13 through a side of the light guide panel 13. Therefore, a light incident efficiency of the light source 12 is high.

However, since the thickness X of the light guide panel 13 is formed identically to the width Y of the light source 12, it is difficult to manufacture a slim LECD device.

In order to manufacture a slim LCD device, as illustrated in FIG. 1B, a method that reduces a thickness X' of the light guide panel 14 compared to a width Y' of the light source 12 has been proposed.

However, if the thickness X' of the light guide panel 14 is reduced, as illustrated in FIG. 1B, an amount of light which is not incident on a side of the light guide panel 14 in light emitted from the light source 12 increases. That is, the light incident efficiency of the light source 12 is reduced.

Therefore, a method that slims an LCD device by reducing the thickness X' of the light guide panel 14 has a limitation.

That is, in the related art LCD device, there is a limitation in slimming an LCD device without a reduction in light incident efficiency.

SUMMARY OF THE INVENTION

Accordingly, the present invention is directed to a backlight unit and an LCD device using the same that substantially obviate one or more problems due to limitations and disadvantages of the related art.

An object of the present invention is to provide a backlight unit and an LCD device using the same, in which an optical film that reflects vertically-incident light at a certain angle is disposed at a front lower end of a light guide panel.

Additional features and advantages of the invention will be set forth in the description which follows, and in part will be apparent from the description, or may be learned by practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a backlight unit includes a light guide panel; a light source unit disposed at a rear-direction lower end of the light guide panel; an optical film disposed in a front direction of the light guide panel to face the light source unit, and configured to reflect light emitted from the light source unit; and an optical sheet part disposed in the front direction of the light guide panel, and configured to change a travel direction of the light, which is output from the light guide panel, to a direction vertical to the light guide panel.

In another aspect, an LCD device includes a cover bottom; a backlight unit disposed at the cover bottom; a liquid crystal panel disposed on the backlight unit, and configured to display an image; a guide panel disposed at the cover bottom, and configured to guide the backlight unit and support the liquid crystal panel; and a top case coupled to the cover bottom in a front direction of the liquid crystal panel, wherein the backlight unit includes: a light guide panel; a light source unit disposed at a rear-direction lower end of the light guide panel; an optical film disposed in a front direction of the light guide panel to face the light source unit, and configured to reflect light emitted from the light source unit; and an optical sheet part disposed in the front direction of the light guide panel, and configured to change a travel direction of the light, which is output from the light guide panel, to a direction vertical to the light guide panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1A:
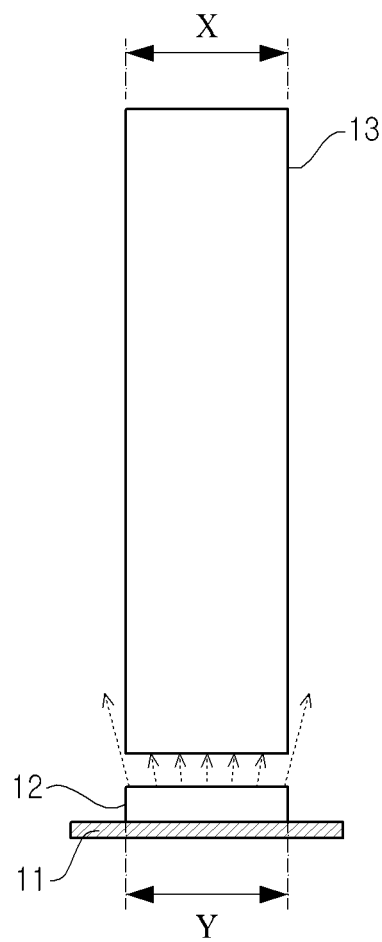
FIGS. 1A and 1B are side views illustrating a configuration of a light source and a light guide panel applied to a related art edge type LCD device.
Figure 1B:
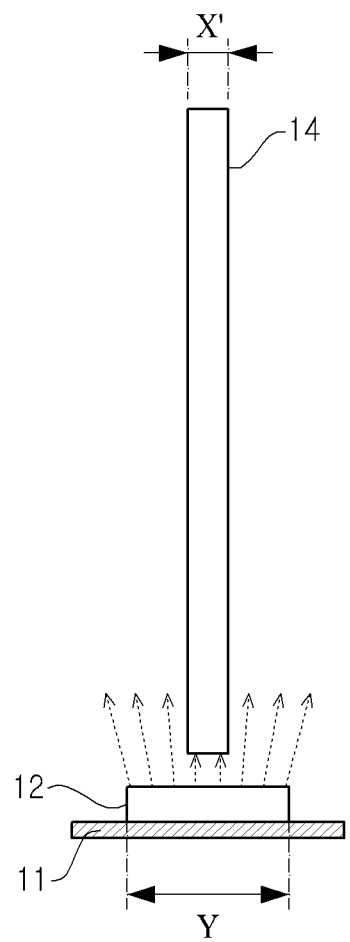
Figure 2:
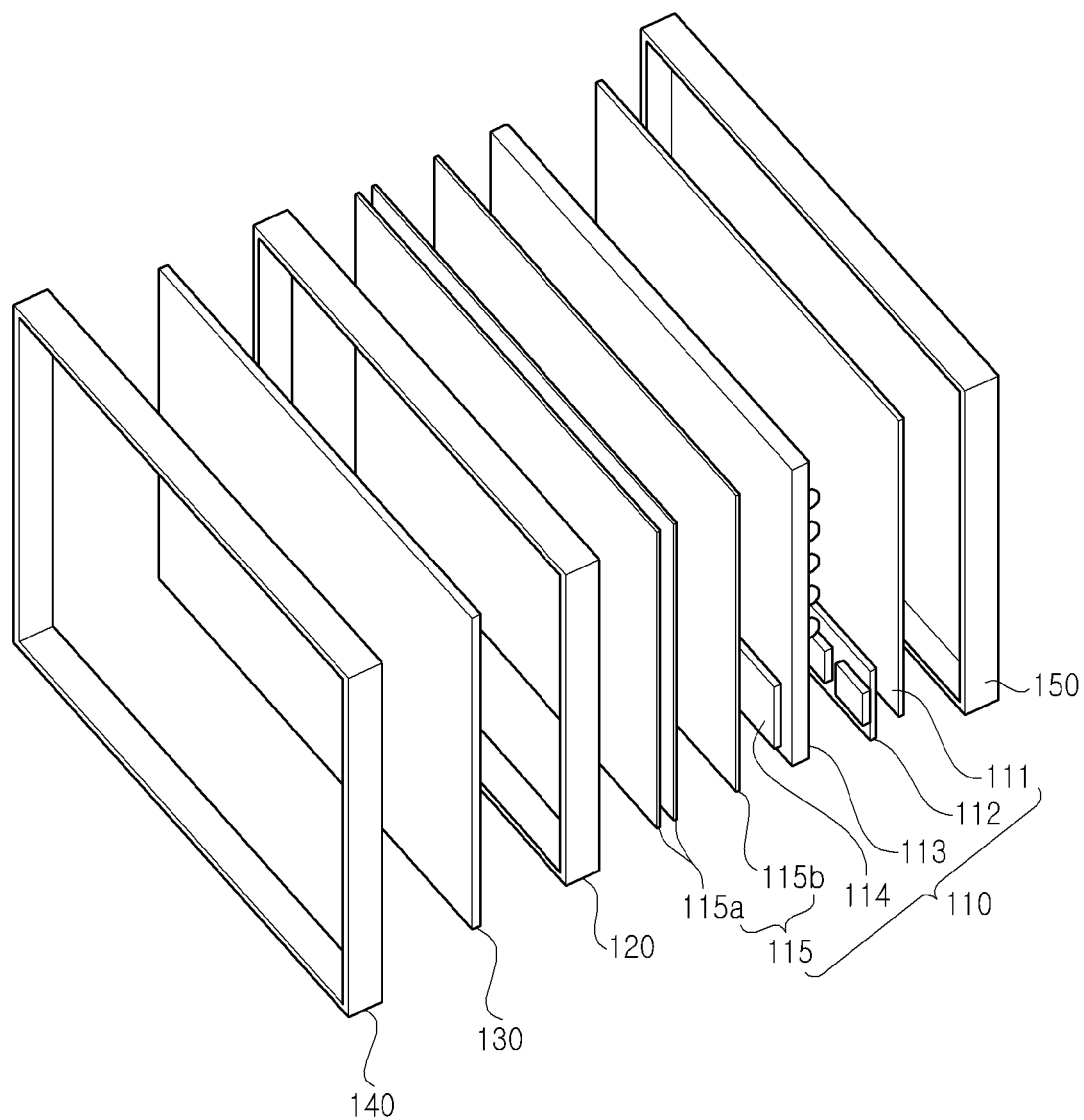
FIG. 2 is an exploded perspective view illustrating a configuration of an LCD device according to an embodiment of the present invention.

FIG. 2 is an exploded perspective view illustrating a configuration of an LCD device according to an embodiment of the present invention.

The LCD device according to an embodiment of the present invention, as illustrated in FIG. 2, includes a cover bottom 150, a backlight unit 110 that is disposed at the cover bottom 150, a liquid crystal panel 130 that is disposed on the backlight unit 110 and displays an image, a guide panel 120 that is disposed at the cover bottom 150, guides the backlight unit 110, and supports the liquid crystal panel 130, and a top case 140 that is coupled to the cover bottom 150 in a front direction of the liquid crystal panel 130.

The backlight unit 110 includes a light guide panel 113, a light source unit 112 that is disposed at a rear-direction lower end of the light guide panel 113, an optical film 114 that is disposed in a front direction of the light guide panel 113 to face the light source unit 112 and reflects light emitted from the light source unit 112, and an optical sheet part 115 that is disposed in the front direction of the light guide panel 113, and changes a travel direction of the light, which is output from the light guide panel 113, to a direction vertical to the light guide panel 113.

First, the light guide panel 113 scatters and reflects the light emitted from the light source unit 112 to transfer the light to the liquid crystal panel 130 which is disposed on the light guide panel 113.

The light guide panel 113 may be formed of a material such as resin or plastic such as polymethylmethacrylate (PMMA).

The light guide panel 113 is guided by the guide panel 110, and is mounted on the cover bottom 150.

Second, the light source unit 112 irradiates the light onto the liquid crystal panel 130 through the light guide panel 113, and may include a light source for emitting the light and a PCB for supporting the light source. An LED package may be applied as the light source.

The LED package may include an LED and a mold that supports the LED.

The light source unit 112, as illustrated in FIG. 2, is disposed at the rear-direction lower end of the light guide panel 113. That is, in a general edge type LCD device, the light source unit 112 is disposed to face one of sides of the light guide panel 113, but in the LCD device according to an embodiment of the present invention, the light source unit 112 is disposed at the rear-direction lower end of the light guide panel 113.

Third, a reflector 111 may be disposed at a rear surface of the light guide panel 113. The reflector 111 may reflect, toward the liquid crystal panel 130, the light which is emitted from the light source unit 112, is incident on the light guide panel 113, and travels in a rear direction of the light guide panel 113.

That is, the light which is emitted from the light source unit 112 and is incident on the light guide panel 113 is refracted by a pattern which is formed at the light guide panel 113, and is reflected toward the liquid crystal panel 130. However, some of the light is leaked to the outside through the rear surface of the light guide panel 113 without being reflected, and thus, the reflector 111 again reflects the leaked light to induce the leaked light to the liquid crystal panel 130.

The reflector 111 may be guided by the guide panel 120, and may be mounted on the cover bottom 150.

In this case, the reflector 111 may be disposed so as not to overlap the light source unit 112. That is, in FIG. 2, the reflector 111 is illustrated as being disposed at a lower end of the light source unit 112, but may not be disposed at the lower end of the light source unit 112.

Fourth, the optical film 114 is disposed in a front direction of the light guide panel 113 to face the light source unit 112, and reflects the light, emitted from the light source unit 112, at a certain angle.

Here, the certain angle denotes an angle that enables the light, reflected by the optical film 114, to be totally reflected from one side to the other side of the light guide panel 113.

That is, the optical film 114 reflects the light which is emitted from the light source unit 112 and is transferred through the light guide panel 113, and enables the reflected light to be totally reflected and moved from one side to the other side of the light guide panel 113.

The optical film 114 may use a holographic optical elements (HOE) film.

The HOE film transmits light of a specific wavelength band, and reflects light of another wavelength band at a certain angle.

Therefore, light incident on the light guide panel 113 may be transferred from a lower end to an upper end of the light guide panel 113 by the optical film 114 which is formed so that an angle at which the light is reflected by the optical film 114 becomes an angle that enables the light, reflected by the optical film 114, to be totally reflected and moved in the light guide panel 113.

A plurality of patterns are formed to be embossed or engraved at the rear surface of the light guide panel 113.

Therefore, light is totally reflected to the front surface and rear surface of the light guide panel 113 by the optical film 114, is reflected by the patterns, and travels in the front direction of the light guide panel 113.

Fifth, the optical sheet part 115 diffuses the light passing through the light guide panel 113, or allows the light, passing through the light guide panel 113, to be vertically incident on the liquid crystal panel 130. The optical sheet part 115 may be variously configured with a diffuser sheet and a prism sheet.

That is, the optical sheet part 115 is disposed in the front direction of the light guide panel 113, and changes a travel direction of the light, output from the light guide panel 113, to a direction vertical to the light guide panel 113.

In particular, when the light source configuring the light source unit 112 emits at least one selected from red light, green light, and blue light, the optical sheet part 115 may include a fluorescent sheet 115b that converts a color of the light, output from the light guide panel 113, into white.

To provide an additional description, when the light source unit 112 emits at least one from red light, green light, and blue light instead of white light, as described above, the optical sheet part 115 may include the fluorescent sheet 115b, which converts, into the white light, at least one selected from the red light, the green light, and the blue light, and an optical sheet 115a that diffuses light output from the fluorescent sheet 115b and changes a travel direction of the light to a direction vertical to the liquid crystal panel 130.

Here, the optical sheet 115a may use sheets which are generally used, and a fluorescent material is applied onto the fluorescent sheet 115b, for performing the above-described function.

The fluorescent material may use a material included in a general organic light emitting diode (OLED) package, for outputting white light.

That is, a light source unit applied to a general edge type LCD device which is used at present includes an LED that emits blue light, a mold into which the LED is built, and an LED package including a fluorescent material that is deposited on a window of the mold and converts the blue light into white light.

Therefore, the fluorescent sheet 115b may be formed of the fluorescent material applied to the above-described general LED package.

The backlight unit 110, the guide panel 120, and the liquid crystal panel 130 are disposed at the cover bottom 150.

The cover bottom 150 is coupled to the top case 140 which is disposed in front of the liquid crystal panel 130, and the elements are built into the cover bottom 150.

In this case, a lower end of the cover bottom 150 at which the light source unit 112 is disposed protrudes to the outside.

That is, the light source unit 112 has a certain thickness and is disposed at the rear surface of the light guide panel 113, and thus protrudes from the rear surface of the light guide panel 113.

Therefore, a lower end of the cover bottom 150, at which the light source unit 112 is disposed and which supports the light guide panel 113 and the light source unit 112, protrudes more outward than an upper end of the rear surface of the light guide panel 113 which is not covered by the light source unit 112.

In this case, since a thickness of the LCD device is generally determined by measuring the slimmest portion, the thickness of the LCD device can be wholly slimmed.

To provide an additional description, the reflector 111 is stacked on a lowermost end of the inside of the cover bottom 150, and the light source unit 112 is disposed at the lowermost end so as not to overlap the reflector 111. The light guide panel 113 is disposed on the reflector 111 and the light source unit 112, and the optical film 114 is disposed at a portion, corresponding to the light source unit 112, of the front surface of the light guide panel 113. The optical sheet part 115 is disposed at a portion, corresponding to the reflector 111, of the front surface of the light guide panel 113. The liquid crystal panel 130, the reflector 111, the light source unit 112, the light guide panel 113, the optical film 114, and the optical sheet part 115 are guided by the guide panel 120. Here, a lower end of the cover bottom 150 at which the light source unit 112 is disposed may protrude toward a rear surface of the cover bottom 150.

The guide panel 120 guides the backlight unit 110, and supports the liquid crystal panel 130.

That is, as illustrated in FIG. 2, the guide panel 120 is formed in a tetragonal frame, and is disposed at the cover bottom 150. The reflector 111, the light source unit 112, the light guide panel 113, the optical film 114, and the optical sheet part 115 which are in the guide panel 120 may be guided by sides of the guide panel 140, and may be respectively fixed to certain positions.

A plurality of grooves or bosses for fixing the reflector 111, the light source unit 112, the light guide panel 113, the optical film 114, and the optical sheet part 115 may be formed at the sides of the guide panel 120.

The liquid crystal panel 130 includes a plurality of pixels which are respectively formed in a plurality of areas defined by intersections between a plurality of gate lines and a plurality of data lines which are formed in a display area, and a thin film transistor (TFT) is formed in each of the plurality of pixels.

In response to a scan signal supplied through a corresponding gate line, the TFT supplies a data voltage, supplied through a corresponding data line, to a pixel electrode. In response to the data voltage, the pixel electrode drives liquid crystal which is disposed between the pixel electrode and a common electrode, thereby adjusting a transmittance of light.

The liquid crystal panel 130 may be driven in an in-plane switching (IPS) mode or a twisted nematic (TN) mode.

In the liquid crystal panel 130 which is driven in the IPS mode, the pixel electrode and the common electrode are disposed on a lower substrate configuring the liquid crystal panel 130, and an alignment of the liquid crystal is adjusted by a lateral electric field generated between the pixel electrode and the common electrode.

The liquid crystal panel 130 may include the lower substrate, an upper substrate, and a liquid crystal layer which is formed between the lower substrate and the upper substrate and into which the liquid crystal is charged. A lower polarizing film is adhered to a bottom of the lower substrate, and an upper polarizing film is adhered to a top of the upper substrate.

The upper polarizing film and the lower polarizing film are adhered to a front surface or a rear surface of the liquid crystal panel 130, and transmit only specific-direction components among components of the light transferred through the light guide panel 113.

To provide an additional description, the liquid crystal panel 130 drives the liquid crystal, which is injected between the upper substrate and the lower substrate, with a voltage applied to the upper substrate or the lower substrate to control a transmittance of the light emitted from the light source unit 112, thereby displaying an image.

Finally, the top case 140 is coupled to the cover bottom 150, and the liquid crystal panel 130 and the above-described elements are built between the top case 140 and the cover bottom 150.

The top case 140 surrounds an outer plane of the liquid crystal panel 130, and light which is transferred from the liquid crystal panel 130 through an opened central portion of the top case 140 is output to the outside.

Recently, an LCD device equipped with the top case 140 having a borderless type is developed and sold for satisfying requirements of consumers in terms of design. The borderless type LCD device may be manufactured in a type where a plane of the liquid crystal panel 130 and a plane of the top case 140 do not have a step height, or may be manufactured in a type where a width of the top case 140 exposed to the plane of the liquid crystal panel 130 is very narrowly formed. Also, the liquid crystal panel 130 may be adhered to the plane of the top case 140 in order for the top case 140 not to be exposed to the plane of the liquid crystal panel 130.

In the LCD device according to an embodiment of the present invention, an HOE film may be applied as the optical film 114, and the optical film 114 and the light source unit 112 may be disposed under at the lower end of the light guide panel 113 with the light guide panel 113 therebetween. Therefore, a slim type backlight unit is implemented, and a slim type LCD device is implemented.

The present invention is for slimming a thickness of the backlight unit 110 and a thickness of the LCD device including the backlight unit 110.

A red LED package that emits red light, a green LED package that emits green light, and a blue LED package that emits blue light may be applied to the light source unit 112 of the backlight unit 110. In this case, the optical sheet part 115 may include the fluorescent sheet 115b that converts, into the white light, at least one selected from the red light, the green light, and the blue light.

According to the above-described embodiment of the present invention, a thin backlight unit is manufactured, and an LCD device using the same is also manufactured in a slim type.

Therefore, a thickness of an electronic device such as a TV or a monitor using the LCD device is also slimmed.

In particular, the present invention slims the thickness of the backlight unit and the thickness of the LCD device without a reduction in a light efficiency of the light source unit. That is, in the present invention, since the light source unit 112 is disposed in a rear direction of the light guide panel 113, most of the light emitted from the light source unit 112 is incident on the inside of the light guide panel 113. Accordingly, the light efficiency of the light source unit 112 is not reduced.

Hereinafter, a structure and a function of the backlight unit 110 will be described in detail with reference to FIGS. 2 to 4.

Figure 3:
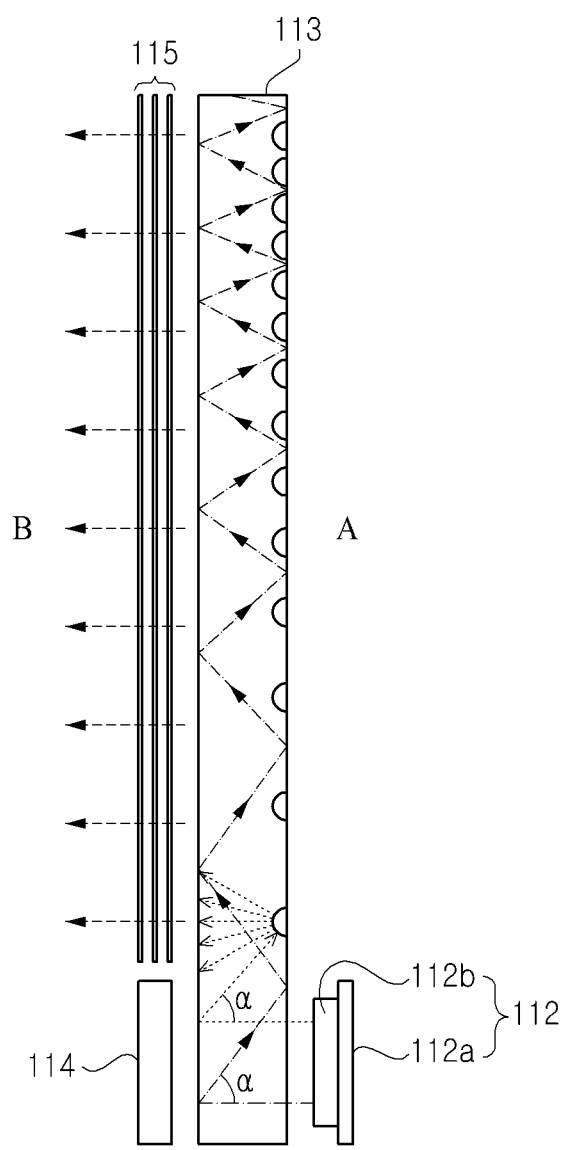
FIG. 3 is a side view illustrating a configuration of a backlight unit according to an embodiment of the present invention.
Figure 4:
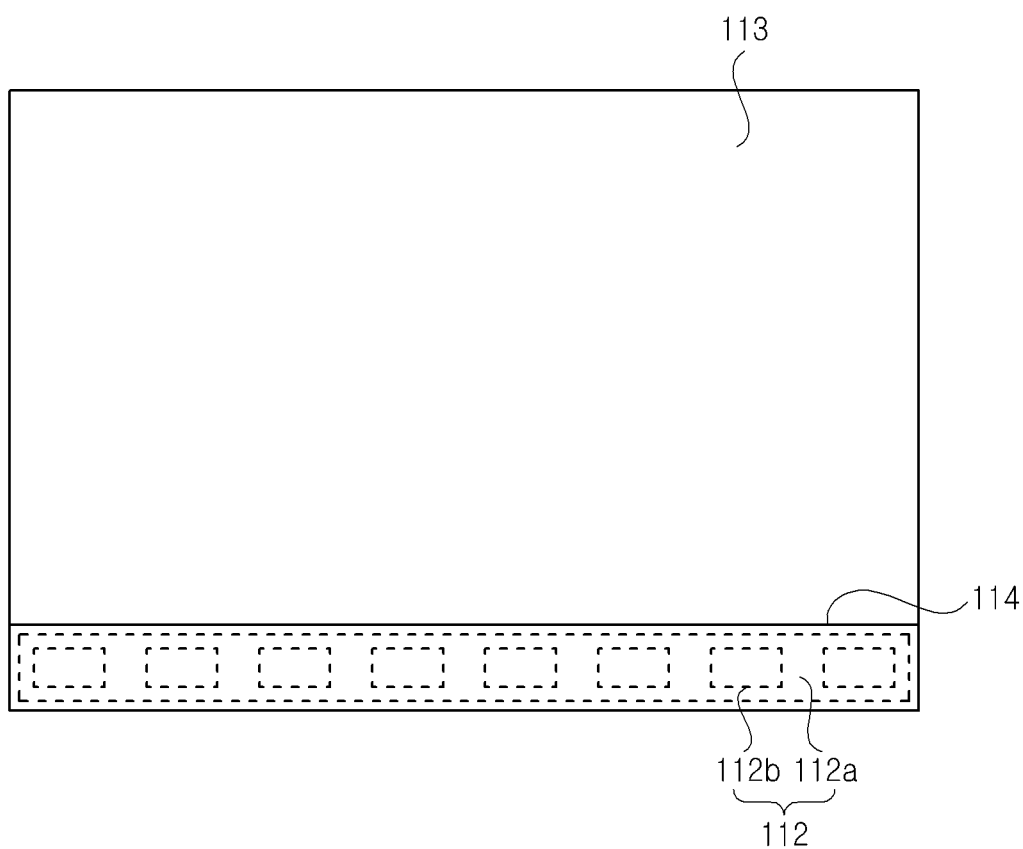
FIG. 4 is a front view illustrating a configuration of the backlight unit according to an embodiment of the present invention.

FIG. 3 is a side view illustrating a configuration of a backlight unit according to an embodiment of the present invention, and FIG. 4 is a front view illustrating a configuration of the backlight unit according to an embodiment of the present invention.

The backlight unit 110 includes a light guide panel 113, a light source unit 112 that is disposed at a rear-direction lower end of the light guide panel 113, an optical film 114 that is disposed in a front direction of the light guide panel 113 to face the light source unit 112 and reflects light emitted from the light source unit 112, and an optical sheet part 115 that is disposed in the front direction of the light guide panel 113, and changes a travel direction of the light, which is output from the light guide panel 113, to a direction vertical to the light guide panel 113. In addition, the backlight unit 110 may further include the reflector 111.

The light source unit 112 includes a light source 112b, which emits light, and a PCB 112a that supports the light source 112b.

The PCB 112a extends along a length direction of the lower end of the light guide panel 113. That is, the light source unit 112 is disposed along the length direction of the lower end of the light guide panel 113.

A plurality of the light sources 112b, as illustrated in FIG. 4, may be mounted on the PCB 112a.

An LED package equipped with an LED may be used as the light source 112b.

One selected from a red LED that emits red light, a green LED that emits green light, and a blue LED that emits blue light may be equipped in the LED package.

Red light, green light, or blue light emitted from the LED is incident on the light guide panel 113, and is reflected by the optical film 114.

However, the LED package (i.e., the light source 112b) may be configured to emit white light. In this case, one selected from the red LED, the green LED, and the blue LED may be equipped in the LED package. In a mold that supports the LED, a fluorescent material for converting red light, green light, or blue light into white light may be coated on a window through which light is output. That is, red light, green light, or blue light emitted from the LED is converted into white light by passing through the fluorescent material, and the white light is incident on the light guide panel 113 and is reflected by the optical film 114.

To provide an additional description, the light source 112b may be configured to emit red light, green light, or blue light, or may be configured to emit white light.

The light guide panel 113, as illustrated in FIG. 3, is disposed between the light source unit 112 and the optical film 114.

A plurality of patterns for reflecting light, which is incident on the light guide panel 113, in a front direction (i.e., a B direction illustrated in FIG. 3) of the light guide panel 113 may be formed at the rear surface (i.e., a surface in an A direction in FIG. 3) of the light guide panel 113.

The patterns, as illustrated in FIG. 3, may be formed to protrude to the inside of the light guide panel 113, or may be formed to protrude in the rear direction of the light guide panel 113. That is, the patterns may be formed in various shapes for achieving the above-described objects.

The optical film 114 reflects the light which is emitted from the light source unit 112 and is transmitted through the light guide panel 113, and allows the reflected light to be totally reflected and moved from one side to the other side of the light guide panel 113.

Here, the one side denotes a lower end in FIG. 3, and the other side denotes an upper end in FIG. 3.

That is, the light reflected by the optical film 114 may be totally reflected and moved from the lower end to the upper end of the light guide panel 113.

The optical film 114 reflects the light, emitted from the light source unit 112, at a certain angle "α" in order for the reflected light to be totally reflected and moved.

The optical film 114, as described above, reflects light of a specific wavelength band at a certain angle, and may be formed of the HOE film.

The light which is reflected at the certain angle "α" by the optical film 114 is totally reflected from the rear surface of the light guide panel 113, is moved to the front surface of the light guide panel 113, and is again totally reflected from the front surface of the light guide panel 113. The total reflection is continuously performed, and thus, the light reflected by the optical film 114 may be transmitted from the lower end to the upper end of the light guide panel 113.

Some of the light which is totally reflected from the inside of the light guide panel 113 and transmitted is reflected by the patterns which are formed at the light guide panel 113, and is transmitted in the front direction of the light guide panel 113.

The optical film 114 is disposed at a position corresponding to the light source unit 112 in the front direction of the light guide panel 113. Therefore, the optical film 114 may be disposed along a length direction of the lower end of the light guide panel 113.

Here, a width of the light source unit 112 and a width of the optical film 114 are formed equally to or smaller than that of a non-display area of the liquid crystal panel which is disposed in the front direction of the light guide panel 113.

That is, light is not transmitted to an area in which the optical film 114 is formed, or light passing through the optical film 114 cannot be used to drive the liquid crystal panel. Therefore, the optical film 114 and the light source unit 112 may be respectively disposed at positions corresponding to the non-display area of the liquid crystal panel 130.

The optical sheet part 115 changes a travel direction of the light, output from the light guide panel 113, to a direction vertical to the light guide panel 113.

In this case, when the light source unit 112 outputs one selected from red light, green light, or blue light, and the optical film reflects the light emitted from the light source unit 112, the optical sheet part 115 may include the fluorescent sheet 115b that converts a color of the light, output from the light guide panel 113, into white.

However, when the light source unit 112 emits white light, and the optical film reflects the white light emitted from the light source unit 112, the optical sheet part 115 may include a plurality of diffuser sheets, which diffuse the light, and a prism sheet that converts the diffused light into light vertical to a rear surface of the liquid crystal panel.

The optical sheet part 115 is disposed at the front surface of the light guide panel 113 so as not to overlap the optical film 114. That is, when the optical sheet 115 overlaps the optical film 114, a bend occurs in the optical sheet part 114, and thus, as illustrated in FIG. 3, the optical sheet part 115 may be disposed at the front surface of the light guide panel 113 so as not to overlap the optical film 114.

Figure 5:
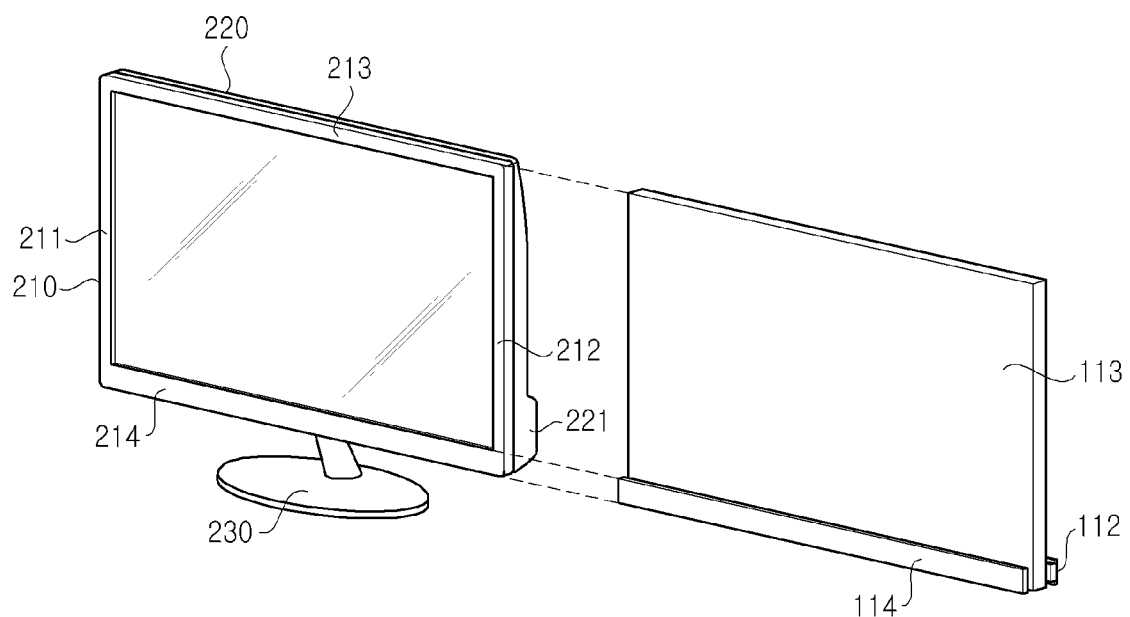
FIG. 5 is a perspective view illustrating an embodiment of a television (TV) to which the LCD device according to an embodiment of the present invention is applied.
Figure 6:
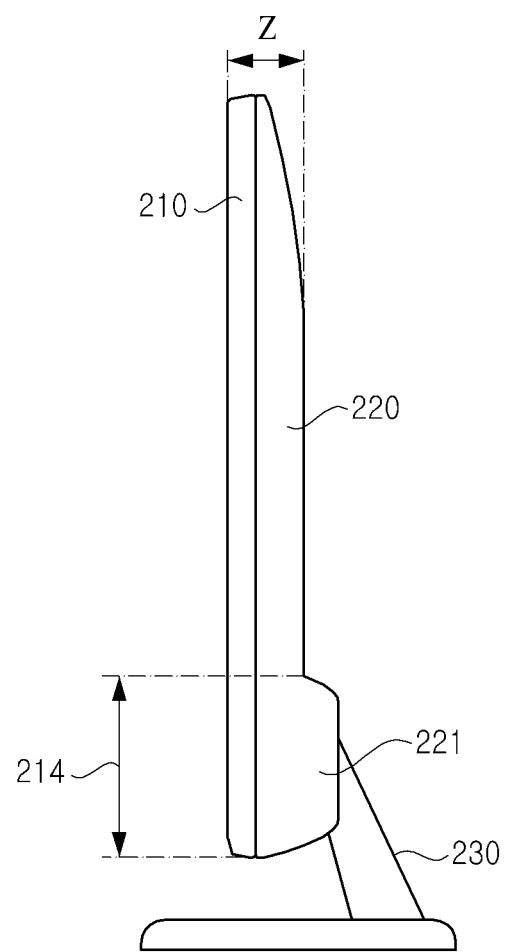
FIG. 6 is a side view illustrating an embodiment of the TV of FIG. 5.

FIG. 5 is a perspective view illustrating an embodiment of a TV to which the LCD device according to an embodiment of the present invention is applied, and FIG. 6 is a side view illustrating an embodiment of the TV of FIG. 5.

The LCD device according to an embodiment of the present invention, as illustrated in FIG. 5, includes the optical film 114, the light source unit 112, and the light guide panel 113 that is disposed between the optical film 114 and the light source unit 112.

Here, as described above, the light source unit 112 and the optical film 114 are respectively disposed at positions corresponding to the non-display area of the liquid crystal panel 130.

The TV, as illustrated in FIGS. 5 and 6, includes a rear cover 220 that covers a rear surface of the LCD device according to an embodiment of the present invention, a front cover 210 that covers a front surface of the LCD device and is coupled to the rear cover 220, and a supporting part 230 that is mounted on the rear cover 220 or the front cover 210 and supports the LCD device.

Here, the front cover 210 may include a first side portion 211, a second side portion 212, a third side portion 213, and a fourth side portion 214 which are respectively formed at upper, lower, left, and right sides of the liquid crystal panel and surround the non-display area.

In this case, the first to third side portions 211 to 213 may be omitted in terms of design, or are slimly formed.

However, various buttons and infrared devices are disposed at the fourth side portion 214, and thus, the fourth side portion 214 is formed to have a certain thickness.

Moreover, as illustrated in FIGS. 5 and 6, the fourth side portion 214 is formed to have a certain thickness so that various drivers configuring the LCD device are mounted on the fourth side portion 214.

In the LCD device according to an embodiment of the present invention, as described above, a lower end of the cover bottom 150 corresponding to the light source unit 112 protrudes to the outside.

Therefore, as illustrated in FIGS. 5 and 6, a rear portion 221 of the rear cover 220 corresponding to the lower end of the cover bottom 150 also protrudes in a rear direction of the rear cover 220.

However, in the LCD device, since the lower end of the cover bottom 150 or a portion of the cover bottom 150 corresponding to the rear portion 221 is slimly formed, a thickness Z of the TV except the rear portion 221 can be reduced compared to a thickness of a related art TV. Accordingly, according to the embodiment of the present invention, a slim type TV and various slim type electronic devices can be manufactured.

According to the embodiments of the present invention, an ultra-thin LCD device having a thin thickness and a television (TV) or a monitor using the same are manufactured.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit, comprising:
a light guide panel;
a light source unit disposed at a rear-direction lower end of the light guide panel;
an optical film disposed in a front direction of the light guide panel to face the light source unit, and configured to reflect light emitted from the light source unit; and
an optical sheet part disposed in the front direction of the light guide panel, and configured to change a travel direction of the light, which is output from the light guide panel, to a direction vertical to the light guide panel.

2. The backlight unit of claim 1, wherein the light source unit is disposed along a length direction of a lower end of the light guide panel, and wherein the optical film is disposed along the length direction of the lower end of the light guide panel.

3. The backlight unit of claim 1, wherein the optical film reflects the light which is emitted from the light source unit and is transferred through the light guide panel, and allows the reflected light to be totally reflected and moved from one side to the other side of the light guide panel.

4. The backlight unit of claim 3, wherein a plurality of patterns for reflecting the totally reflected light in the front direction of the light guide panel are formed at a rear surface of the light guide panel.

5. The backlight unit of claim 3, wherein the light source unit emits one selected from red light, green light, and blue light, wherein the optical film reflects the light emitted from the light source unit, and wherein the optical sheet part comprises a fluorescent sheet configured to convert a color of the light, output from the light guide panel, into white.

6. The backlight unit of claim 3, wherein the light source unit emits white light, and wherein the optical film reflects the white light.

7. The backlight unit of claim 1, wherein a width of the light source unit and a width of the optical film are equal to or smaller than a width of a non-display area of a liquid crystal panel which is disposed in the front direction of the light guide panel.

8. The backlight unit of claim 1, wherein the optical sheet part is disposed at a front surface of the light guide panel not to overlap the optical film.

9. A liquid crystal display (LCD) device, comprising:
a cover bottom;
a backlight unit disposed at the cover bottom;
a liquid crystal panel disposed on the backlight unit, and configured to display an image;
a guide panel disposed at the cover bottom, and configured to guide the backlight unit and support the liquid crystal panel; and
a top case coupled to the cover bottom in a front direction of the liquid crystal panel,
wherein the backlight unit comprises:
a light guide panel;
a light source unit disposed at a rear-direction lower end of the light guide panel;
an optical film disposed in a front direction of the light guide panel to face the light source unit, and configured to reflect light emitted from the light source unit; and
an optical sheet part disposed in the front direction of the light guide panel, and configured to change a travel direction of the light, which is output from the light guide panel, to a direction vertical to the light guide panel.

10. The LCD of claim 9, wherein a lower end of the cover bottom, at which the light source unit is disposed, protrudes to an outside.

* * * * *